(12) United States Patent
Gribble et al.

(10) Patent No.: US 8,779,946 B1
(45) Date of Patent: Jul. 15, 2014

(54) EMULATION OF AIRCRAFT ADVISORY PANELS

(75) Inventors: David A. Gribble, Cedar Rapids, IA (US); David L. Leedom, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 49 days.

(21) Appl. No.: 13/597,551

(22) Filed: Aug. 29, 2012

(51) Int. Cl.
*G01C 23/00* (2006.01)

(52) U.S. Cl.
USPC ................................ 340/971; 340/945; 701/3

(58) Field of Classification Search
CPC ........ G01C 1/00; G01C 21/005; G01C 21/28; G01C 21/30; G01C 21/32; G01C 21/36; G01C 23/00; G01C 23/05; G09F 1/00; G06F 3/0481; G06F 3/0484; G06F 3/0487
USPC ......... 340/945, 959, 960, 963, 967, 971, 973, 340/974, 977, 979; 345/156, 173, 184; 701/3, 21, 22, 23; 705/14.42, 14.43, 705/14.47; 434/2, 5
See application file for complete search history.

(56) References Cited

U.S. PATENT DOCUMENTS

| | | | | |
|---|---|---|---|---|
| 5,549,477 | A * | 8/1996 | Tran et al. | 434/5 |
| 6,711,475 | B2 * | 3/2004 | Murphy | 701/3 |
| 7,487,015 | B1 * | 2/2009 | Houlbert | 701/3 |
| 8,175,761 | B2 * | 5/2012 | Nichols et al. | 701/14 |
| 2006/0271249 | A1 * | 11/2006 | Testrake et al. | 701/3 |
| 2008/0204419 | A1 * | 8/2008 | Grothe | 345/173 |
| 2011/0006983 | A1 * | 1/2011 | Grothe | 345/157 |

* cited by examiner

*Primary Examiner* — Van T. Trieu
(74) *Attorney, Agent, or Firm* — Donna P. Suchy; Daniel M. Barbieri

(57) ABSTRACT

The present disclosure is directed to a method for updating a system for providing a centralized status indication of an aircraft. The system includes a plurality of indicators, and the method includes the step of replacing the plurality of indicators with a single display. The display is configured for presenting an emulated view of the plurality of indicators. The next step of the method involves receiving status information for at least one indicator of the plurality of indicators from an existing logic associated with the plurality of indicators. The next step of the method is to display an emulated view of the plurality of indicators. The emulated view includes an icon associated with each indicator of the plurality of indicators, and each icon is placed in a similar geographical location as the associated indicator.

21 Claims, 5 Drawing Sheets

EMULATION OF AIRCRAFT ADVISORY PANELS

TECHNICAL FIELD

The present disclosure generally relates to avionics displays, and more particularly to a system and method for emulating aircraft advisory panels.

BACKGROUND

A group of lights known as an annunciator panel may be used as a central indicator of status of equipment or systems in an aircraft. The annunciator panels may include a collection of annunciator lights that indicate the status of the aircraft's subsystems. The annunciator lights may have different colors to provide different meanings. For example, a red annunciator light may be a warning indicating the system is in critical condition and requires immediate attention. An orange or yellow annunciator light may indicate a caution signal, meaning a system requires timely attention now or in the near future. A green annunciator light may be an advisory signal, meaning a system is ready for use or currently in use. Last, a white or blue annunciator light may be an advisory signal indicating a system is in use. Some aircraft may also include Master Warning or Master Caution annunciator lights or switches. These Master Warning or Master Caution annunciator lights may illuminate if a red or yellow annunciator is activated. A flash may also be used with the Master Warning annunciator light, and may demand acknowledgement (for example, by pressing the light) before the light will stop flashing. Updating and replacement of annunciator panels and related systems is an ongoing issue for aircraft.

SUMMARY

The present disclosure is directed to a system which may be used to replace a plurality of legacy indicators with a single display. The system includes a display, a controller, and a memory. The controller is configured for running an emulation program and the display is configured for presenting an emulated view of the plurality of legacy indicators. The controller of the system may be connected to and/or communicatively coupled to an existing logic of the plurality of legacy indicators. Using the system, the controller receives status information for the legacy indicators from the existing logic and uses the status information to generate the emulated view of the plurality of legacy indicators for the display.

The present disclosure is also directed to a method for emulating a system for providing a centralized status indication of an aircraft. The method includes the step of replacing a plurality of existing indicators with a single display. The display is configured for presenting an emulated view of the plurality of existing indicators. The method also includes the step of receiving signals from an existing logic associated with the plurality of existing indicators. The next step of the method is to display the emulated view of the plurality of existing indicators. The emulated view includes an icon associated with each existing indicator of the plurality of existing indicators, and the icons are arranged in the same manner as the plurality of existing indicators. The method can provide an emulated display panel for an existing system for providing a centralized status indication of an aircraft. For example, the method can be used to replace an annunciator panel by emulating the annunciator panel view on a display.

The present disclosure is also directed to a method for updating a system for providing a centralized status indication of an aircraft. The system includes a plurality of indicators, and the method includes the step of replacing the plurality of indicators with a single display. The display is configured for presenting an emulated view of the plurality of indicators. The next step of the method is to receive status information for at least one indicator of the plurality of indicators from the existing logic associated with the plurality of indicators. The next step of the method is to display an emulated view of the plurality of indicators. The emulated view includes an icon associated with each indicator of the plurality of indicators, and each icon is placed in a similar geographical location as the associated indicator.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Annunciator panels are typically located in the cockpit of the aircraft and may occupy a significant amount of space. If an aircraft is to be updated with new systems and displays in the cockpit, the presence of annunciator panels can be problematic. The annunciator panels may need to be replaced in order to allow for the updated systems. One option for updating the cockpit systems is to replace the annunciator panels with a Crew Awareness System, but this may require significant aircraft certification work and changes to the flight manual and flight checklists. Similarly, replacing the annunciator panels with a Crew Awareness System may require additional training for flight crews. The present disclosure addresses some of the issues of the prior art by providing the system 100 shown in FIG. 1. The system 100 provides a centralized status indication of an aircraft using an emulated view of a plurality of legacy indicators associated with a centralized status indicating system. The system 100 may be used in a retrofit application where an aircraft has an existing annunciator panel and the aircraft is undergoing a flight deck upgrade. The system 100 can be used to replace the existing annunciator panel and to provide an emulated view of the prior system.

Figure 1:
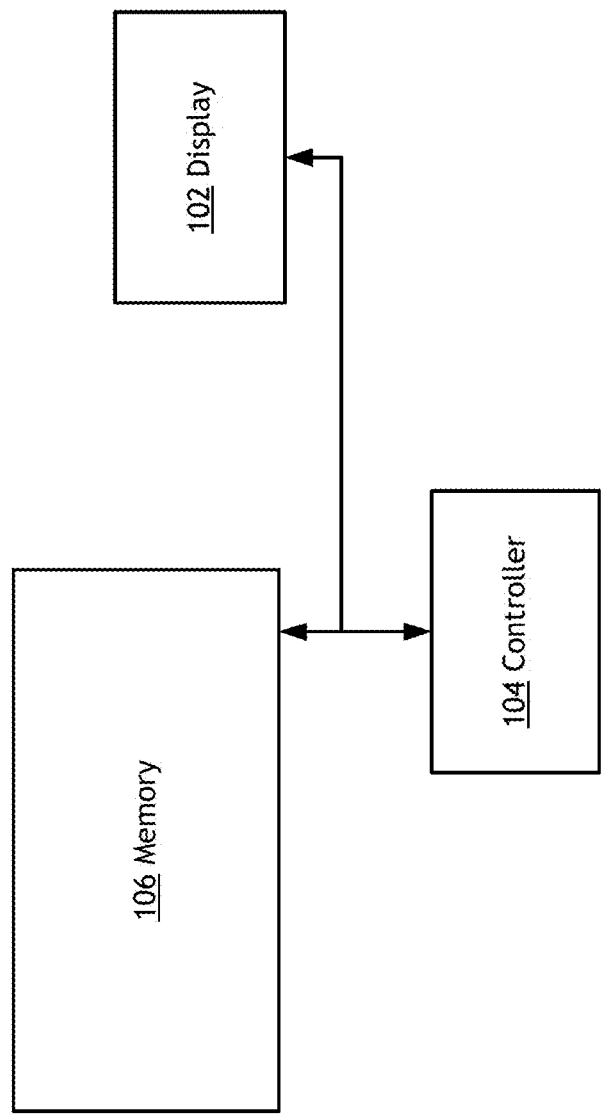
FIG. 1 shows a system for providing a centralized status indication of an aircraft.

FIG. 1 depicts an exemplary system 100 which may be used to replace a plurality of legacy indicators with a single display. The system 100 includes a display 102, a controller 104, and a memory 106. The controller 104 is configured for running an emulation program and the display 102 is configured for presenting the emulated view of the plurality of legacy indicators. The display 102, controller 104, and memory 106 may be coupled to one another via a bus (e.g., a wired and/or wireless bus). The system 100 may be configured (e.g. running software and/or firmware stored in memory 106; employing application specific circuitry, etc.) to display an emulated view of the prior system (e.g. by the display 102).

The memory 106 may be any system and/or device capable of storing data. In one embodiment, memory 106 stores computer code that, when executed by controller 104, causes controller 104 to perform a method for emulating the view of the prior system. The emulation program may include an icon associated with each indicator of the plurality of legacy indicators. Each icon may be placed in a similar geographical location as its associated legacy indicator, in order to display a view that appears similar or identical to the prior system.

The controller 104 of the system 100 may be connected to and/or communicatively coupled to the existing logic of the plurality of legacy indicators. The existing logic of the prior system may refer to the logic that controlled the plurality of legacy indicators and communicated status information about the legacy indicators, such as when the legacy indicator should be illuminated, flashing, or turned off. This existing logic may include an existing cable and connector structure or other structure used for controlling the prior system.

The controller 104 of the system 100 may be connected to and/or communicatively coupled to the existing logic of the plurality of legacy indicators. Using the system 100, the controller 104 receives status information for the legacy indicators of the plurality of legacy indicators from the existing logic and uses the status information to generate the emulated view of the legacy indicator for the display 102. During operation of the system 100, the controller 104 receives status information for the legacy indicators from the existing logic. The controller 104 uses the status information to generate the emulated view of the prior system for the display 102.

The display 102 of the system 100 shown in FIG. 1 may include a display device for displaying graphical, video, photographic, and textual information to an operator. For example, the display may be a screen, multi-function display, monitor, cathode ray tube, liquid crystal display, head up display, head down display, projector, plasma, flat panel or any other type of display suitable for an aircraft cockpit. The display 102 may also be configured to receive inputs from an operator such as requests, information, or commands. For example, the display 102 may include a touch screen, a multi-touch surface, a pressure-triggered screen with a stylus, a keyboard, mouse, or any other suitable device for receiving inputs from an operator.

The system 100 may include a software tool that is configured to allow an installer to enable or disable particular indicators of the plurality of legacy indicators during installation or after. For example, a particular indicator may be obsolete after the update and that indicator will not need to be featured on the emulated view. The software tool is configured to allow the particular legacy indicator to be disabled. Similarly, when connecting the system 100 to the logic for the prior system, the name and color of each indicator may be defined, and each indicator may be associated with a particular input. The use of the software tool may facilitate the certification process of the aircraft.

The system 100 shown in FIG. 1 may operate individually or in parallel and cooperatively with other aircraft systems and displays. For example, the display 102, controller 104 and memory 106 may operate with other systems within the aircraft and run other applications for the aircraft in addition to the emulation program. Accordingly, the display 102 may include views and information from other programs. For example, the display 102 may display information in a picture in picture format. Other information may be shown in sequence or an operator may select what to display at a particular time. It may also be possible to use an external signal, such as an alarm or timer to determine what information is displayed at a given time.

The system 100 shown in FIG. 1 may also be configured to allow an operator to hide or minimize the display of the emulated view during normal conditions, preserving the flight display space for other tasks and information. For example, if no warning or caution lights are activated, an operator may wish to hide the emulated view to allow for other information to be shown. If a warning or caution light is activated, the system 100 may force the display of the emulated view and not permit it to be hidden. This provides the flight crew with flexibility in using the flight display space, while ensuring that essential status warnings are conveyed.

The system 100 may incorporate components of the prior system for providing a centralized status indication of an aircraft. For example, the system 100 may include a Master Caution indicator or a Master Warn indicator. The system 100 may also include a lamp test derived from the prior system for providing a centralized status indication of an aircraft, which can be used as a system level integrity test for the system 100.

The system 100 may also include features that highlight changes to the emulated view since the last time an operator viewed it. For example, the system 100 shown in FIG. 1 may be configured to present an Advisory Summary to an operator. The Advisory Summary may include a compact summary of the status of the systems subject to the emulated view. For example, the Advisory Summary may include an indication that there is a "New Advisory" message, meaning a new advisory indicator has activated since the last time the emulated view was viewed. Similarly, the Advisory Summary may include a generic "Advisory" message, indicating that at least one advisory indicator is activated. The Advisory Summary may be helpful because many advisory messages are persistent and do not require full time monitoring. The Advisory Summary helps the flight crew quickly identify which advisories may be new or recent.

The system 100 may also show changes to the emulated view since the last time an operator viewed it by flashing or highlighting one of the icons in the emulated view. For example, an icon may blink or glow to distinguish it from the other icons if the icon has been activated since the last time an operator viewed the emulated view.

Figure 2:
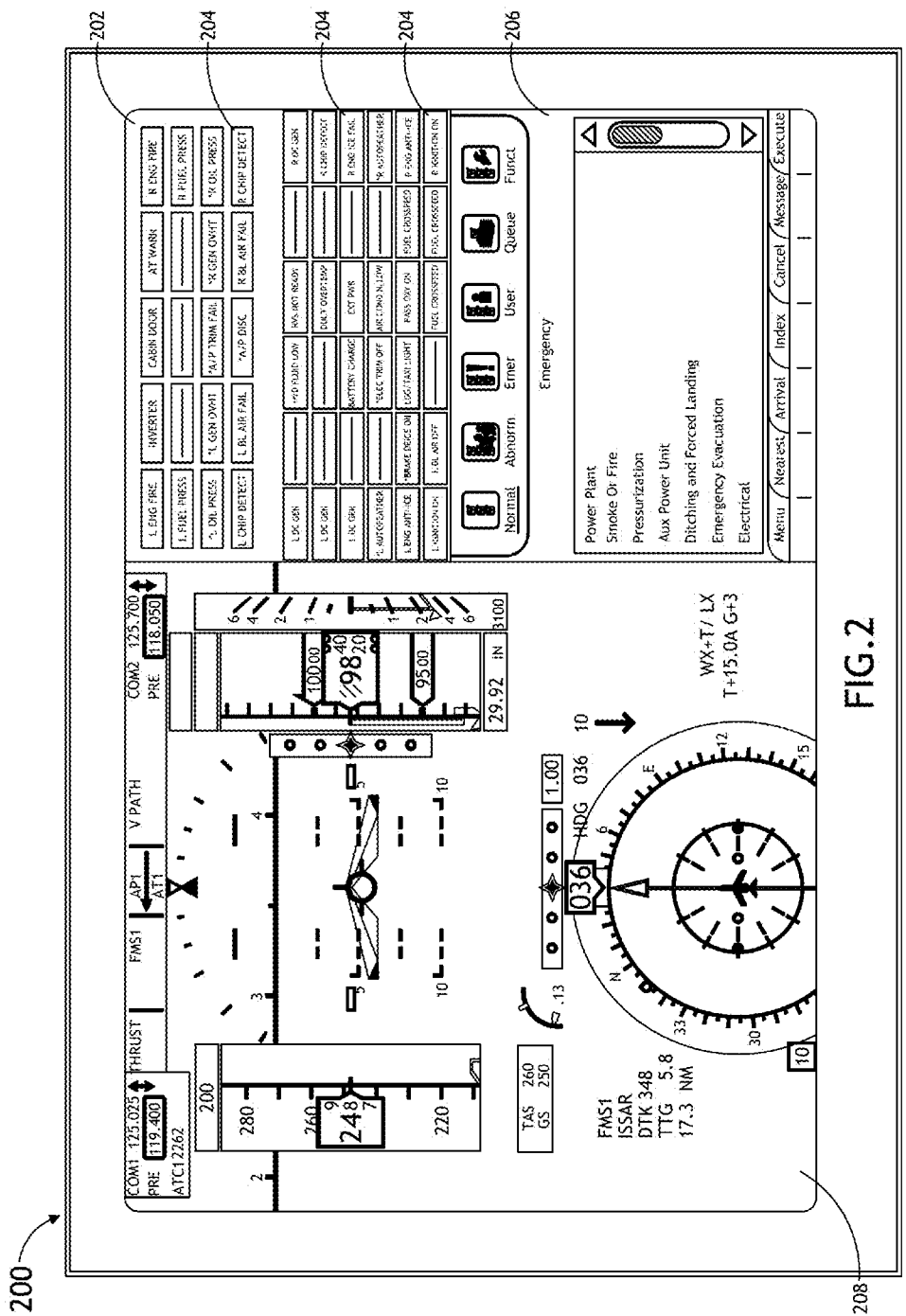
FIG. 2 shows an example of a display showing an emulated view of a prior system of an aircraft.

An example of the display 200 showing the emulated view 202 in accordance with the present disclosure is shown in FIG. 2. The view in FIG. 2 shows the display 200, including the emulated view 202 of the plurality of legacy indicators. The emulated view 202 includes the plurality of icons 204. Each icon 204 is associated with a legacy indicator for the prior central indications system of the aircraft (such as the legacy annunciator panel). The display 200 also includes an electronic checklist 206 for the aircraft, as well as the primary flight display 208 for the aircraft.

Figure 3:
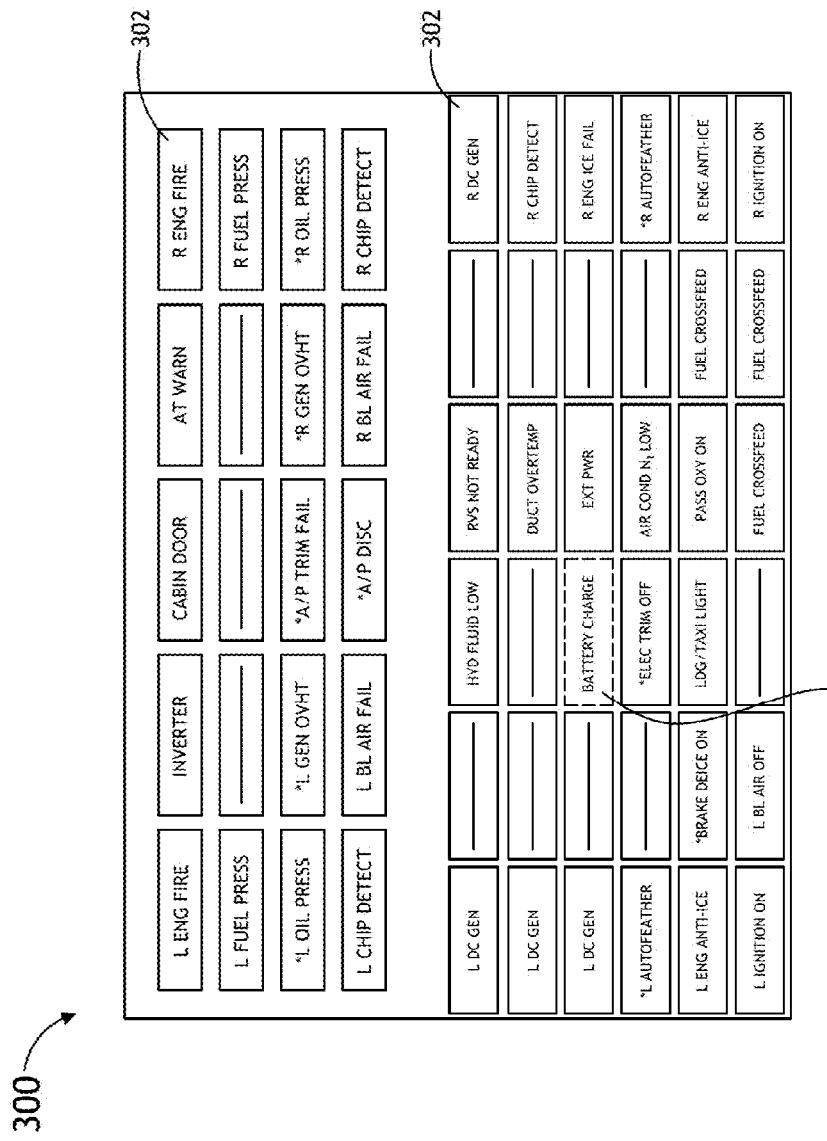
FIG. 3 shows an example of a display of the system for providing a centralized status indication of an aircraft.

An example of the display 300 of the system for providing centralized status indication of an aircraft is shown in FIG. 3. The display 300 provides an emulated view of a plurality of legacy indicators associated with a centralized status indicating system for the aircraft. The emulated view includes a plurality of icons 302. Each icon 302 of the plurality of icons corresponds to a legacy indicator associated with the prior centralized status indicating system. The display 300 may include a feature for highlighting one of the icons to a user since the last time the user viewed the display. For example, in FIG. 3 the "Battery Charge" icon is highlighted, and may be flashing or blinking in order to communicate to a user that this icon has been activated since the last time the user viewed the display 300. This may occur if the user has minimized or hidden the display 300 to view other information, and then returns to the display at a later time.

Figure 4:
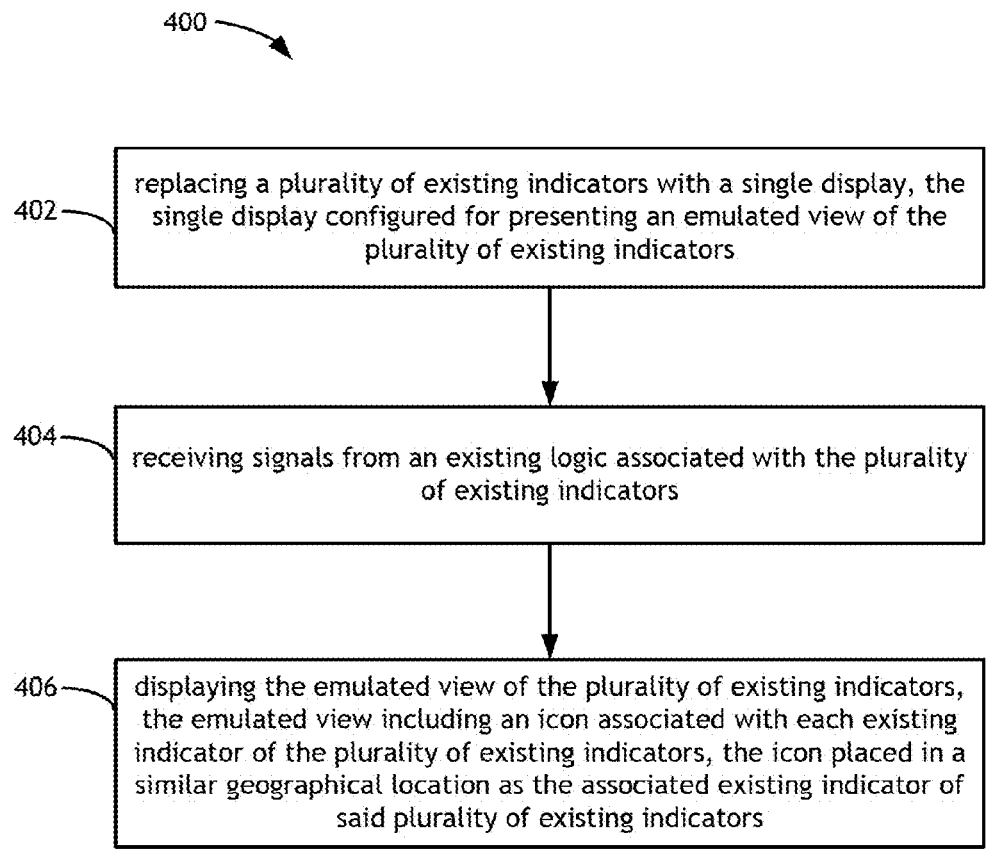
FIG. 4 is a flow diagram of a method for emulating a system for providing a centralized status indication of an aircraft.

The present disclosure is also directed to a method 400 for emulating a system for providing a centralized status indication of an aircraft, as shown in FIG. 4. The method includes the step of replacing a plurality of existing indicators with a single display 402. The display is configured for presenting an emulated view of the plurality of existing indicators.

As shown in FIG. 4, the method 400 also includes the step of receiving signals from an existing logic associated with the plurality of existing indicators 404. The next step of the method 400 is to display the emulated view of the plurality of existing indicators 406. The emulated view includes an icon associated with each existing indicator of the plurality of existing indicators, and the icons are arranged in the same manner as the plurality of existing indicators. The method 400 can provide an emulated display panel for an existing system for providing a centralized systems indication of an aircraft. For example, the method 400 can be used to replace an annunciator panel by emulating the annunciator panel view on a display.

The method 400 may also include the step of verifying the operation of each of the plurality of existing indicators. For example, during installation it may be verified that each indicator of the plurality of existing indicators is operational and properly communicating with the system to provide the emulated view of the prior system. In addition, the method 400 shown in FIG. 4 may include the step of preserving a Master Caution indicator of the existing system for providing a centralized status indication of an aircraft. For example, when the existing or prior system is replaced with the new system, the Master Caution indicator of the existing system is retained intact or with limited modification. The Master Caution indicator of the prior system is then incorporated into the new system and may be displayed alongside the emulated view of the new system. Similarly, the Master Warning indicator of the prior system may also be maintained in the same manner.

The step of displaying the emulated view of the plurality of existing indicators 406 of the method 400 may include the step of highlighting at least one icon associated with each existing indicator of the plurality of existing indicators. The highlighting step may be performed after the emulated view has been hidden and then restored, in order to highlight changes to the emulated view to an operator since the operator's last view. Similarly, the step of displaying the emulated view of the plurality of existing indicators 406 of the method 400 may include the step of displaying an advisory summary. The advisory summary may include a summary of the status of the plurality of existing indicators. The advisory summary may be displayed after the emulated view has been hidden and then restored in order to highlight changes, or may be displayed at other times to make it easy for an operator to identify changes or matters requiring attention in the emulated view.

The method 400 shown in FIG. 4 may also include the step of hiding or minimizing the emulated view when no warning indicators or caution indicators are activated. For example, an operator may hide the display of the emulated view during normal conditions when no warning or caution icons are active, preserving the flight display space for other tasks and information. Similarly, the method 400 may also include the step of displaying the emulated view if a warning or caution light is activated. For example, if an operator has hidden the emulated view in order to view other information on the display because no warning or caution indicators were active, but then a warning indicator comes on, the emulated view may be automatically restored.

Figure 5:
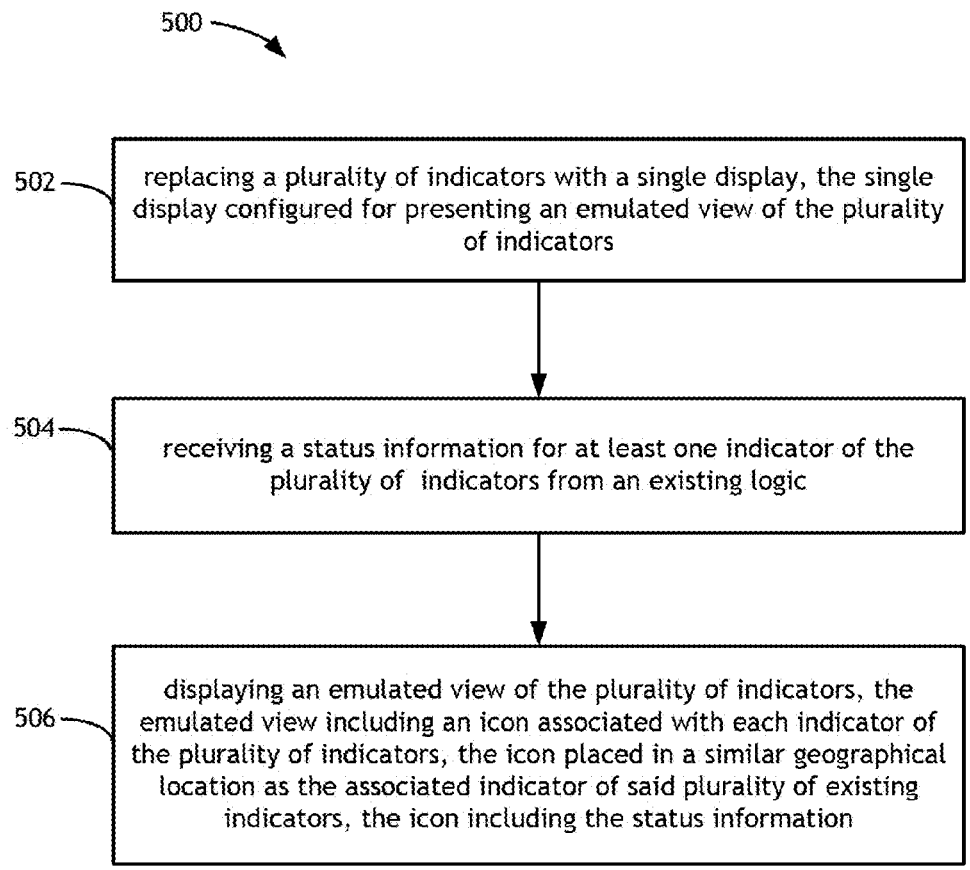
FIG. 5 is a flow diagram of a system for providing a centralized status indication of an aircraft.

The present disclosure is also directed to a method 500 for updating a system for providing a centralized status indication of an aircraft as shown in FIG. 5. The system includes a plurality of indicators, and the method includes the step of replacing the plurality of indicators with a single display 502. The display is configured for presenting an emulated view of the plurality of indicators. A further step of the method involves receiving status information for at least one indicator of the plurality of indicators from an existing logic associated with the plurality of indicators 504. The next step of the method is to display an emulated view of the plurality of indicators 506. The emulated view includes an icon associated with each indicator of the plurality of indicators, and each icon is placed in a similar geographical location as the associated indicator.

The method 500 may be used in an aircraft retrofit application, where an existing annunciator panel will be replaced with an updated display system. In order to avoid costs associated with retraining staff, rewriting manuals, and recertifying the aircraft, the new system is configured to emulate the existing annunciator panel.

The system and methods of the present disclosure may be configured to streamline certification of the aircraft with the updated system. For example, the system and methods of the present disclosure may be configured to comply with a Technical Standard Order as issued by the United States Federal Aviation Administration. Similarly, the use of the system and methods of the present disclosure may minimize flight crew training requirements and modifications to existing checklists and flight manuals for the prior system.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for emulating an existing system for providing a centralized status indication of an aircraft, the method comprising:

replacing a plurality of existing indicators with a single display, the single display configured for presenting an emulated view of the plurality of existing indicators;

receiving signals from an existing logic associated with the plurality of existing indicators;

displaying the emulated view of the plurality of existing indicators, the emulated view including an icon associated with each existing indicator of the plurality of existing indicators, the icon placed in a similar geographical location as the associated existing indicator of said plurality of existing indicators.

2. The method of claim 1, further comprising:
preserving a Master Caution indicator of the existing system for providing the centralized status indication of the aircraft.

3. The method of claim 1, further comprising:
preserving a Master Warning indicator of the existing system for providing the centralized status indication of the aircraft.

4. The method of claim 1, wherein the displaying the emulated view of the plurality of existing indicators includes highlighting at least one icon associated with each existing indicator of the plurality of existing indicators.

5. The method of claim 1, further comprising:
displaying an advisory summary, the advisory summary including a summary of the status of the plurality of existing indicators.

6. The method of claim 1, further comprising:
minimizing the emulated view when a warning indicator and a caution indicator are not activated.

7. The method of claim 6, further comprising:
restoring the emulated view when at least one of the warning indicator or the caution indicator is activated.

8. A system for providing an emulated view of a plurality of legacy indicators of an aircraft, comprising:
a display, the display configured for presenting an emulated view of the plurality of legacy indicators;
a controller, the controller connected to an existing logic of the plurality of legacy indicators, the controller configured for running an emulation program, the emulation program including an icon associated with each indicator of the plurality of legacy indicators, each icon placed in a similar geographical location as the associated legacy indicator;
a memory, the memory configured for storing the emulation program; wherein the controller receives a status information for at least one legacy indicator of the plurality of legacy indicators from the existing logic and generates the emulated view of the legacy indicator for the display.

9. The system of claim 8, further comprising:
a Master Caution indicator, the Master Caution indicator derived from an existing system for providing a centralized status indication of an aircraft.

10. The system of claim 8, further comprising:
a Master Warning indicator, the Master Warning indicator derived from an existing system for providing a centralized status indication of an aircraft.

11. The system of claim 8, wherein the controller is further configured to highlight at least one icon associated with each legacy indicator of the plurality of legacy indicators.

12. The system of claim 8, wherein the controller is further configured to receive an input from an operator.

13. The system of claim 8, wherein the controller is further configured to provide an advisory summary, the advisory summary including a summary of the status of the plurality of existing indicators.

14. The system of claim 8, wherein the controller is further configured to minimize the emulated view when a warning indicator and a caution indicator are not activated, and the controller is further configured to restore the emulated view when at least one of: the warning indicator is activated or the caution indicator is activated.

15. A method for updating a system for providing a centralized status indication of an aircraft, the system including a plurality of indicators, the method comprising:
replacing the plurality of indicators with a single display, the single display configured for presenting an emulated view of the plurality of indicators;
receiving a status information for at least one indicator of the plurality of indicators from an existing logic associated with the plurality of indicators;
displaying an emulated view of the plurality of indicators, the emulated view including an icon associated with each indicator of the plurality of indicators, the icon placed in a similar geographical location as the associated indicator of said plurality of existing indicators, the icon including the status information.

16. The method of claim 15, further comprising:
preserving a Master Caution indicator of the system for providing a centralized status indication of an aircraft.

17. The method of claim 15, further comprising:
preserving a Master Warning indicator of the system for providing a centralized status indication of an aircraft.

18. The method of claim 15, wherein the displaying the emulated view of the plurality of indicators includes highlighting at least one icon associated with each existing indicator of the plurality of existing indicators.

19. The method of claim 15, further comprising:
displaying an advisory summary, the advisory summary including a summary of the status of the plurality of indicators.

20. The method of claim 15, further comprising:
minimizing the emulated view when a warning indicator and a caution indicator are not activated.

21. The method of claim 15, further comprising:
displaying the emulated view when at least one of: a warning indicator is activated or a caution indicator is activated.

* * * * *